United States Patent
Yang et al.

(10) Patent No.: US 10,539,129 B2
(45) Date of Patent: Jan. 21, 2020

(54) ELECTRIC MACHINE DRIVING METHOD AND SYSTEM UNDER NON-CONVENTIONAL WORK MODE OF OIL PUMPING UNIT

(71) Applicant: HARBIN SURFICS ELECTRICAL TECHNOLOGY INC, Harbin (CN)

(72) Inventors: Ye Yang, Harbin (CN); Lin Wang, Harbin (CN); Min Zhang, Harbin (CN); Mingting Han, Harbin (CN); Yanan Sun, Harbin (CN); Chunlong Sun, Harbin (CN); Guoqing Wang, Harbin (CN); Hongliang Gong, Harbin (CN); Jie Zhang, Harbin (CN); Wen Xing, Harbin (CN); Feng Wei, Harbin (CN); Deshi Zhang, Harbin (CN); Jinyuan Li, Harbin (CN); Chenglin Liu, Harbin (CN); Feifei Wan, Harbin (CN); Yunlong Chen, Harbin (CN)

(73) Assignee: HARBIN SURFICS ELECTRICAL TECHNOLOGY INC, Harbin (CN)

( * ) Notice: Subject to any disclaimer, the term of this patent is extended or adjusted under 35 U.S.C. 154(b) by 0 days.

(21) Appl. No.: 16/309,934

(22) PCT Filed: May 10, 2017

(86) PCT No.: PCT/CN2017/083801
§ 371 (c)(1),
(2) Date: Dec. 14, 2018

(87) PCT Pub. No.: WO2018/014633
PCT Pub. Date: Jan. 25, 2018

(65) Prior Publication Data
US 2019/0145228 A1     May 16, 2019

(30) Foreign Application Priority Data

Jul. 20, 2016 (CN) .......................... 2016 1 0574182

(51) Int. Cl.
*F04B 47/02* (2006.01)
*H02P 27/04* (2016.01)
(Continued)

(52) U.S. Cl.
CPC .......... *F04B 47/022* (2013.01); *E21B 43/127* (2013.01); *F04B 23/023* (2013.01);
(Continued)

(58) Field of Classification Search
CPC .... E21B 41/0092; E21B 43/12; E21B 43/121; E21B 43/126; E21B 43/127;
(Continued)

(56) References Cited

U.S. PATENT DOCUMENTS 6,325,142 B1 * 12/2001 Bosley ................ E21B 47/0008
166/53
2008/0048840 A1    2/2008 Reagan
(Continued)

FOREIGN PATENT DOCUMENTS

CN     201381841 Y     1/2010
CN     204258689 U     4/2015
(Continued)

*Primary Examiner* — Patrick Hamo
*Assistant Examiner* — Chirag Jariwala
(74) *Attorney, Agent, or Firm* — Gokalp Bayramoglu

(57) ABSTRACT

The present invention discloses a method and a system pertaining to the field of oil production engineering. According to the method, the crank complete-cycle operation uses a utility frequency driving mode, and the crank incomplete-cycle pumping operation and the crank incomplete-cycle no-pumping, operation use a variable, frequency driving mode. The system is provided with a utility frequency loop and a variable frequency loop which are provided with a common input terminal and a common output terminal. The common input terminal of the utility frequency loop and the variable frequency loop is connected to a utility frequency (Continued)

power supply circuit, and the output terminal is connected to a driving electric machine of the oil pumping unit. A frequency changer is configured in the variable frequency loop. An operation control unit is further configured outside the utility frequency loop and the variable frequency loop.

1 Claim, 7 Drawing Sheets

(51) Int. Cl.
  *H02P 1/52* (2006.01)
  *F04B 23/02* (2006.01)
  *H02P 21/34* (2016.01)
  *E21B 43/12* (2006.01)
(52) U.S. Cl.
  CPC ............ *H02P 1/52* (2013.01); *H02P 21/34* (2016.02); *H02P 27/04* (2013.01)
(58) Field of Classification Search
  CPC .. E21B 2043/125; F04B 23/00; F04B 23/023; F04B 47/00; F04B 47/02; F04B 47/022; F04B 47/028; F04B 47/14; F04B 49/02; F04B 49/06; H02P 21/18; H02P 21/34; H02P 27/04; H02P 27/05; H02P 1/52
  See application file for complete search history.

(56) References Cited

U.S. PATENT DOCUMENTS

| | | | | |
|---|---|---|---|---|
| 2013/0334998 | A1* | 12/2013 | Osman | H02P 1/028 |
| | | | | 318/503 |
| 2017/0002805 | A1* | 1/2017 | Williams | F04B 49/20 |
| 2018/0351497 | A1* | 12/2018 | Osman | H02P 27/04 |

FOREIGN PATENT DOCUMENTS

| | | |
|---|---|---|
| CN | 105007022 A | 10/2015 |
| CN | 105134139 A | 12/2015 |
| CN | 105804699 A | 7/2016 |
| CN | 106208896 A | 12/2016 |
| CN | 106703758 A | 5/2017 |
| CN | 107387028 A | 11/2017 |

\* cited by examiner

ELECTRIC MACHINE DRIVING METHOD AND SYSTEM UNDER NON-CONVENTIONAL WORK MODE OF OIL PUMPING UNIT

CROSS-REFERENCE TO RELATED APPLICATIONS

This application is the national phase entry of International Application No. PCT/CN2017/083801, filed on May 10, 2017, which is based upon and claims priority to Chinese Patent Application No. 201610574182.2 filed on Jul. 20, 2016, the entire contents of which are incorporated herein by reference.

TECHNICAL FIELD

The electric machine driving method and system under the non-conventional work mode of the oil pumping unit of the present invention pertain to the field of oil production engineering.

BACKGROUND

In the process of oil production, if the supply of fluid from the low-yield wells is insufficient, the theoretical displacement of a single well needs to be reduced. Since the work mode of the conventional operations of the walking beam oil pumping unit is limited to a continuous complete-cycle motion of the crank, the theoretical displacement of the single well can only be reduced by reducing the working strokes in the whole process or using the interval pumping work mode. However, the reduction of strokes in the whole cycle will cause the problem that the leakage rate of the plunger pump gradually increases, and the driving efficiency of the motor will gradually decrease as the motor speed decreases. Moreover, the use of interval pumping work mode will waste a large amount of manpower, material resources, and financial resources.

Regarding the technical requirements for reducing the theoretical displacement of a single well, and in order to overcome the technical problems caused by reducing the working strokes in the whole process and using the interval pumping work mode, both of the Patent application No. 201510783876.2, entitled "No-pumping/swabbing Operation Method for Walking Beam Pumping Unit Based on Crank incomplete-Cycle Motion" and the Patent application No. 201510838831.0, entitled "Dynamic Variable Stroke Operation Method For Walking Beam Pumping Unit Based on Crank Incomplete-cycle Motion" break through the technical bias that the walking beam pumping unit only has one operation mode, i.e., the crank continuous complete-cycle motion. With the incomplete-cycle swing motion of the crank, a no-pumping/swabbing or pumping/swabbing operation without the need of shutting down can be realized. If the traditional crank continuous complete-cycle motion is combined with the crank incomplete-cycle motion proposed by the two patents mentioned above, the theoretical displacement of a single well can be reasonably reduced. Meanwhile, the problems of large plunger leakage rate and reduced motor chive efficiency in the working strokes of the whole process can be solved, and the problem that the interval work mode causes waste of manpower, material resources, and financial resources can also be solved.

Based on the above-mentioned ideas, in the patent application No. 201610326037.2 entitled "Combined Operating Method for the Work Mode of Walking Beam Pumping Unit", the crank complete-cycle operation, the crank incomplete-cycle pumping/swabbing operation, and the crank incomplete-cycle no-pumping/swabbing operation are combined, and the combination scheme of the three work modes are provided. Namely, the scheme of how to allocate the parameters (e.g. the number of times, time of duration, etc.) of the three work modes according to the number of theoretical full-stroke pumping/swabbing in a cycle.

In order to break through the technology biases that the walking beam pumping unit only has one operation mode, i.e. the crank continuous complete-cycle motion, and to combine the crank complete-cycle operation, the crank incomplete-cycle pumping/swabbing operation, and the crank incomplete-cycle no-pumping/swabbing operation, the conventional driving mode of the motor used to drive the crank needs to be changed to support the above mentioned aspects. However, neither the patent application No. 201510783876.2 entitled "No-pumping/swabbing Operation Method for Walking Beam Pumping Unit Based on Crank Incomplete-Cycle Motion" and the patent application No. 201510838831.0 "Dynamic Variable Stroke Operation Method For Walking Beam Pumping Unit Based on Crank Incomplete-cycle Motion", nor the patent application No. 201610326037.2 entitled "Combined Operating Method for the Work Mode of the Walking Beam Pumping Unit" disclose how to combine the crank complete-cycle operation, the incomplete-cycle pumping/swabbing operation, and the incomplete-cycle no-pumping/swabbing operation and the driving means of the electric machine under such non-conventional work mode.

SUMMARY

Regarding the above-mentioned problems, the present invention discloses an electric machine driving method and a system thereof under the non-conventional work mode of an oil pumping unit. The electric machine driving method and system not only provide the solution of how to realize the electric machine driving under the non-conventional work mode, i.e. the work mode of combining the crank complete-cycle operation, the crank incomplete-cycle pumping operation, and the crank incomplete-cycle no-pumping operation, but also can reduce the actual operation time of the variable frequency driving and the working intensity of the frequency changer under the situation where the desired stroke frequency in the actual production is not equal to the stroke frequency of the utility frequency, thereby effectively improving the heat dissipation conditions of the frequency changer and prolonging the service life of the frequency changer.

The objectives of the present invention are realized by the following solutions.

An electric machine driving method under a non-conventional work mode of an oil pumping unit capable of switching over a crank complete-cycle operation, a crank incomplete-cycle pumping operation, and a crank incomplete-cycle no-pumping operation without shutting down the oil pumping unit, wherein the crank complete-cycle operation uses a utility frequency driving mode, the crank incomplete-cycle pumping operation and the crank incomplete-cycle no-pumping operation use a variable frequency driving mode.

The above-mentioned electric machine driving method under the non-conventional work mode of the oil pumping unit is as follows:

The method of switching from the variable frequency driving mode to the utility frequency driving mode includes:

first, driving the oil pumping unit, the variable frequency driving mode, to perform the crank incomplete-cycle pumping operation and the crank incomplete-cycle no-pumping operation; then, adjusting and controlling mechanical energy accumulated by a mechanical system of the oil pumping unit by means of adjusting a swing amplitude during the crank incomplete-cycle pumping operation and the crank incomplete-cycle no-pumping operation, so that a peak rotating speed of the electric machine in a bidirectional motion is constantly adjusted. When a rotating speed of the electric machine in the same direction as the utility frequency driving mode falls within a neighborhood containing a rated rotating speed of the electric machine under the utility frequency driving mode, the variable frequency driving mode is switched to the utility frequency driving mode.

The method of switching from the utility frequency driving mode to the variable frequency driving mode includes: first, turning off the utility frequency driving mode to make the oil pumping unit enter a free-running operation state, then switching to the variable frequency driving mode in response to the rotating speed of the electric machine fallen within a neighborhood containing a predetermined rotating speed of the electric machine.

An electric machine driving system under a non-conventional work mode of an oil pumping unit for implementing the above-mentioned electric machine driving method under the non-conventional work mode of the oil pumping unit, wherein the electric machine driving system is configured with a utility frequency loop and a variable frequency loop, and the utility frequency loop and the variable frequency loop are provided with a common input terminal and a common output terminal; the common input terminal of the utility frequency loop and the variable frequency loop is connected to a utility frequency power supply circuit, and the common output terminal of the utility frequency loop and the variable frequency loop is connected to a driving electric machine of the oil pumping unit; a frequency changer is configured in the variable frequency loop; and an operation control unit is further configured outside the utility frequency loop and the variable frequency loop;

the utility frequency loop is configured to enable the electric machine to drive the crank complete-cycle operation;

the variable frequency loop is configured to enable the electric machine to drive the crank complete-cycle pumping operation and the crank incomplete-cycle no-pumping operation;

the operation control unit is configured to receive a rotating speed signal of the electric machine obtained through an analysis and a calculation by the frequency changer, and implement a driving control on the electric machine by the frequency changer according to the rotating speed of the electric machine, or change an on-off state of the utility frequency loop and the variable frequency loop.

An electric machine driving system under a non-conventional work mode of an oil pumping unit for implementing the above-mentioned electric machine driving method under the non-conventional work mode of the oil pumping unit, wherein the electric machine driving system is configured with a utility frequency loop and a variable frequency loop, and the utility frequency loop and the variable frequency loop are provided with a common input terminal and a common output terminal; the common input terminal of the utility frequency loop and the variable frequency loop is connected to a utility frequency power supply circuit, and the common output terminal of the utility frequency loop and the variable frequency loop is connected to a driving electric machine of the oil pumping unit; a frequency changer is configured in the variable frequency loop; an operation control unit is further provided outside the utility frequency loop and the variable frequency loop; and an electric machine rotating speed sensor is further installed on the electric machine;

the utility frequency loop is configured to enable the electric machine to drive the crank complete-cycle operation;

the variable frequency loop is configured to enable the electric machine to drive the crank complete-cycle pumping operation and the crank incomplete-cycle no-pumping operation;

the electric machine rotating speed sensor is configured to monitor the rotating speed of the electric machine and directly send the monitored data to the operation control unit, or send the monitored data to the operation control unit via the frequency changer; the operation control unit is configured to receive a rotating speed signal of the electric machine, and implement a driving control on the electric machine by the frequency changer according to the rotating speed of the electric machine, or change the on-off state of the utility frequency loop and the variable frequency loop;

the above-mentioned electric machine drive system under the non-conventional work mode of the oil pumping unit further includes a utility frequency start-up loop connected in parallel with the utility frequency loop, the utility frequency start-up loop is serially connected to an anti-surge electric reactor, a voltage-dividing resistor or an automatic voltage-adjusting device;

the process of switching from the variable frequency driving mode to the utility frequency driving mode includes: turning off the variable frequency loop, turning on the utility frequency start-up loop, turning on the utility frequency loop, and turning off the utility frequency start-up loop;

the process of switching from the utility frequency driving mode to the variable frequency driving mode includes: turning off the utility frequency loop and turning on the variable frequency loop.

In the above-mentioned electric machine driving system under the non-conventional work mode of the oil pumping unit, a rated power of the frequency changer is less than a rated power of the electric machine.

Advantages

First, the present invention proposes to use the utility frequency driving mode in the crank complete-cycle operation, and use the variable frequency driving mode in the crank incomplete-cycle pumping operation and the crank incomplete-cycle no-pumping operation. Also, the present invention provides the solution of how to realize the electric machine driving under the non-conventional work mode, i.e. the work mode of combining the crank complete-cycle operation, the crank incomplete-cycle pumping operation, and the crank incomplete cycle no-pumping operation.

Second, for the oil well that the desired stroke frequency in the actual production is not equal to the stroke frequency under utility frequency, although the design with a variable frequency drive device installed on the oil pumping unit already exists, and the variable frequency drive device is usually configured with a utility frequency loop, the utility frequency loop is merely used as a standby loop in the prior art. The utility frequency driving mode is only temporarily used in two extremely special cases, namely, the variable frequency driving failure or the workover operation. While, in other cases, the variable frequency driving mode is applied all the time. Namely, the utility frequency driving mode is not a normal working state. The present invention is essentially different than the variable frequency driving device which is configured with the utility frequency loop in that in the case that the desired stroke frequency of the actual production is not equal to the utility frequency stroke frequency, the utility frequency driving mode is combined with the variable frequency driving mode, and the utility frequency driving mode is used to drive the crank complete-cycle operation, so that the actual working time of the variable frequency driving mode and the working intensity of the frequency changer can be reduced, the heat dissipation condition of the frequency changer can be effectively improved, and the service life of the frequency changer can be prolonged.

DETAILED DESCRIPTION OF THE EMBODIMENTS

Figure 1:
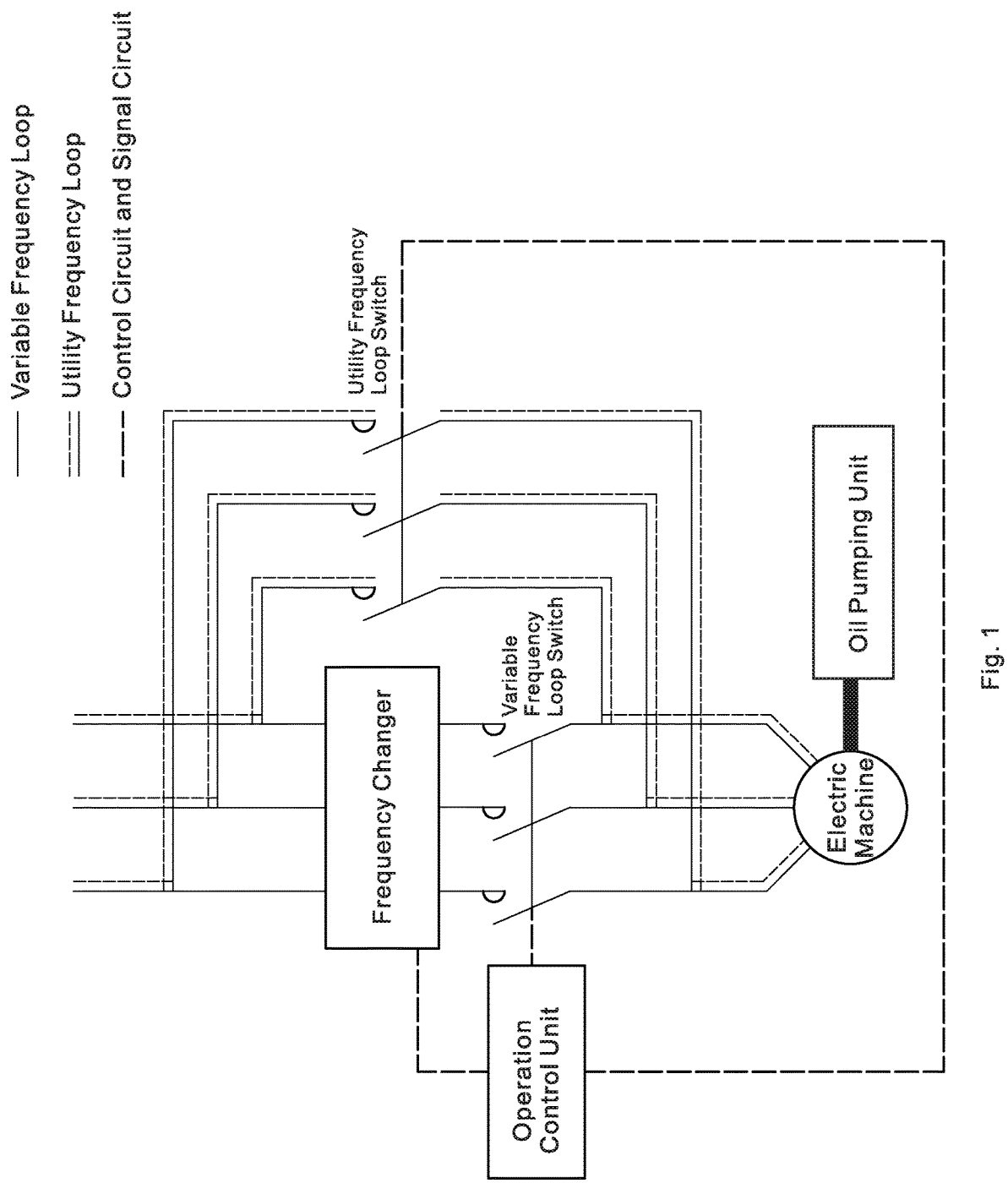
FIG. 1 is a first structural schematic diagram showing the electric machine driving system under the non-conventional work mode of the oil pumping unit of the present invention.

The embodiments of the present invention will be described in detail hereinafter with reference to the drawings.

Embodiment 1

The present embodiment is an embodiment of an electric machine driving method under the non-conventional work mode of the oil pumping unit.

The electric machine driving method under a non-conventional work mode of an oil pumping unit is capable of switching over a crank complete-cycle operation, a crank incomplete-cycle pumping operation, and a crank incomplete-cycle no-pumping operation without shutting down the oil pumping unit. The crank complete-cycle operation uses a utility frequency driving mode, the crank incomplete-cycle pumping operation and the crank incomplete-cycle no-pumping operation use a variable frequency driving mode.

Embodiment 2

The present embodiment is an embodiment of an electric machine driving method under the non-conventional work mode of the oil pumping unit.

The electric machine driving method under the non-conventional work mode of the oil pumping unit of the present embodiment is further limited based on the Embodiment 1 as follows.

The method of switching from the variable frequency driving mode to the utility frequency driving mode is as follows. First, the oil pumping unit is driven by the variable frequency driving mode to perform a crank incomplete-cycle pumping operation and a crank incomplete-cycle no-pumping operation. Then, the mechanical energy accumulated by a mechanical system of the oil pumping unit is adjusted and controlled by means of adjusting a swing amplitude during the crank incomplete-cycle pumping operation and the crank incomplete-cycle no-pumping operation, so that a peak rotating speed of the electric machine in a bidirectional motion is constantly adjusted. When a rotating speed of the electric machine in the same direction as the utility frequency driving mode falls within a neighborhood containing a rated rotating speed of the electric machine under the utility frequency driving mode, the variable frequency driving mode is switched to the utility frequency driving mode.

The method of switching from the utility frequency driving mode to the variable frequency driving mode is as follows. First, the utility frequency driving mode is turned off to make the oil pumping unit enter a free-running operation state. Then, the utility frequency driving mode is switched to the variable frequency driving mode in response to the rotating speed of the electric machine fallen within a neighborhood containing a predetermined rotating speed of the electric machine.

For Embodiment 2, what should be explained is as follows.

1. In the present embodiment, in the process of switching from the variable frequency driving mode to the utility frequency driving mode, the variable frequency driving mode is only switched to the utility frequency driving mode when the rotating speed of the electric machine in the same direction as the utility frequency driving mode falls within a neighborhood containing a rated rotating speed of the electric machine under the utility frequency driving mode. In the process of switching from the utility frequency driving mode to the variable frequency driving mode, the utility frequency driving mode is only switched to the variable frequency driving mode when the rotating speed of the electric machine falls within a neighborhood containing a predetermined rotating speed of the electric machine. Such a soft-switching mode is helpful in preventing mechanical shocks caused by sudden change of the rotating speed of the electric machine from damaging the electric machine itself and the speed reducer, thereby increasing the service life of the oil pumping unit.

2. In the process of switching from the variable frequency driving mode to the utility frequency driving mode, if the rotating speed of the electric machine is low, the frequency changer needs to drive the electric machine to output a relatively high driving torque when the electric machine is accelerated to the utility frequency rated speed of the electric machine without changing the direction. While, in the process that the electric machine is driven by the frequency changer to drive the oil pumping unit to implement the crank incomplete-cycle pumping operation and the crank incomplete-cycle no-pumping operation, the mechanical system of the oil pumping unit is enabled to accumulate a relatively large amount of mechanical potential energy by gradually increasing the swing amplitude of the crank during the multiple reciprocating reversing motions. Based on the effect of potential to kinetic energy conversion, the peak rotating speed of the electric machine is constantly increased during the bidirectional operation. When the rotating speed of the electric machine in the same direction as the utility frequency driving mode falls within a neighborhood containing a rated rotating speed of the electric machine under the utility frequency driving mode, the variable frequency driving mode is switched to the utility frequency driving mode.

3. By using the variable driving method with multiple directional changes, the peak rotating speed of the electric machine is constantly increased by constantly accumulating the mechanical energy of the mechanical system of the oil pumping unit. With this accumulation mode, the problem of insufficient driving capability of the frequency changer does not exist. As a result, the use of a low-power frequency changer is realized, and the equipment cost is reduced.

Embodiment 3

The present embodiment is an embodiment of an electric machine drive system under the non-conventional work mode of the oil pumping unit.

The electric machine driving system under the non-conventional work mode of the oil pumping unit of the present embodiment is shown in FIG. 1. The electric machine driving system is configured with a utility frequency loop and a variable frequency loop. The utility frequency loop and the variable frequency loop are provided with a common input terminal and a common output terminal. The common input terminal of the utility frequency loop and the variable frequency loop is connected to a utility frequency power supply circuit, and the common output terminal of the utility frequency loop and the variable frequency loop is connected to a driving electric machine of the oil pumping unit. A frequency changer is configured in the variable frequency loop. An operation control unit is further configured outside the utility frequency loop and the variable frequency loop.

The utility frequency loop is configured to enable the electric machine to drive the crank complete-cycle operation.

The variable frequency loop is configured to enable the electric machine to drive the crank incomplete-cycle pumping operation and the crank incomplete-cycle no-pumping operation.

The operation control unit is configured to receive a rotating speed signal of the electric machine obtained through an analysis and a calculation by the frequency changer, and implement a driving control on the electric machine by the frequency changer according to the rotating speed of the electric machine, or change an on-off state of the utility frequency loop and the variable frequency loop.

Embodiment 4

The present embodiment is an embodiment of an electric machine driving system under the non-conventional work mode of the oil pumping unit.

Figure 2:
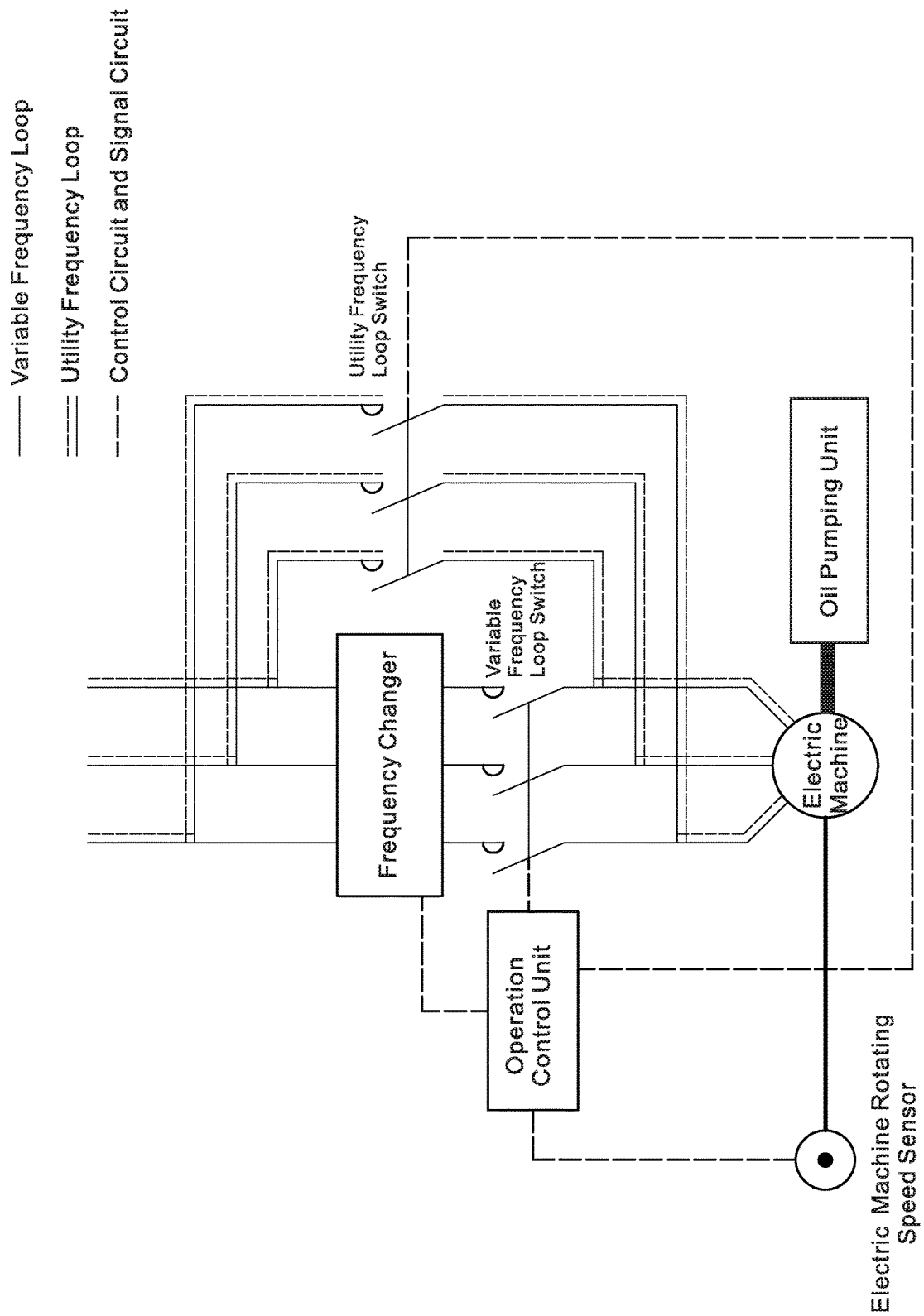
FIG. 2 is a second structural schematic diagram showing the electric machine driving system under the non-conventional work mode of the oil pumping unit of the present invention.

The electric machine driving system under the non-conventional work mode of the oil pumping unit of the present embodiment is shown in FIG. 2. The electric machine driving system is configured with a utility frequency loop and a variable frequency loop. The utility frequency loop and the variable frequency loop are provided with a common input terminal and a common output terminal The common input terminal of the utility frequency loop and the variable frequency loop is connected to a utility frequency power supply circuit, and the common output terminal of the utility frequency loop and the variable frequency loop is connected to a driving electric machine of the oil pumping unit. A frequency changer is configured in the variable frequency loop. An operation control unit is further provided outside the utility frequency loop and the variable frequency loop. An electric machine rotating speed sensor is further installed on the electric machine.

The utility frequency loop is configured to enable the electric machine to drive the crank compete-cycle operation.

The variable frequency loop is configured to enable the electric machine to drive the crank incomplete-cycle pumping operation and the crank incomplete-cycle no-pumping operation.

The electric machine rotating speed sensor is configured to monitor the rotating speed of the electric machine and directly send the monitored data to the operation control unit. The operation control unit is configured to receive a rotating speed signal of the electric machine, and implement a driving control on the electric machine by the frequency changer according to the rotating speed of the electric machine, or change the on-off state of the utility frequency loop and the variable frequency loop.

Embodiment 5

The present embodiment is an embodiment of an electric machine driving system under the non-conventional work mode of the oil pumping unit.

Figure 3:
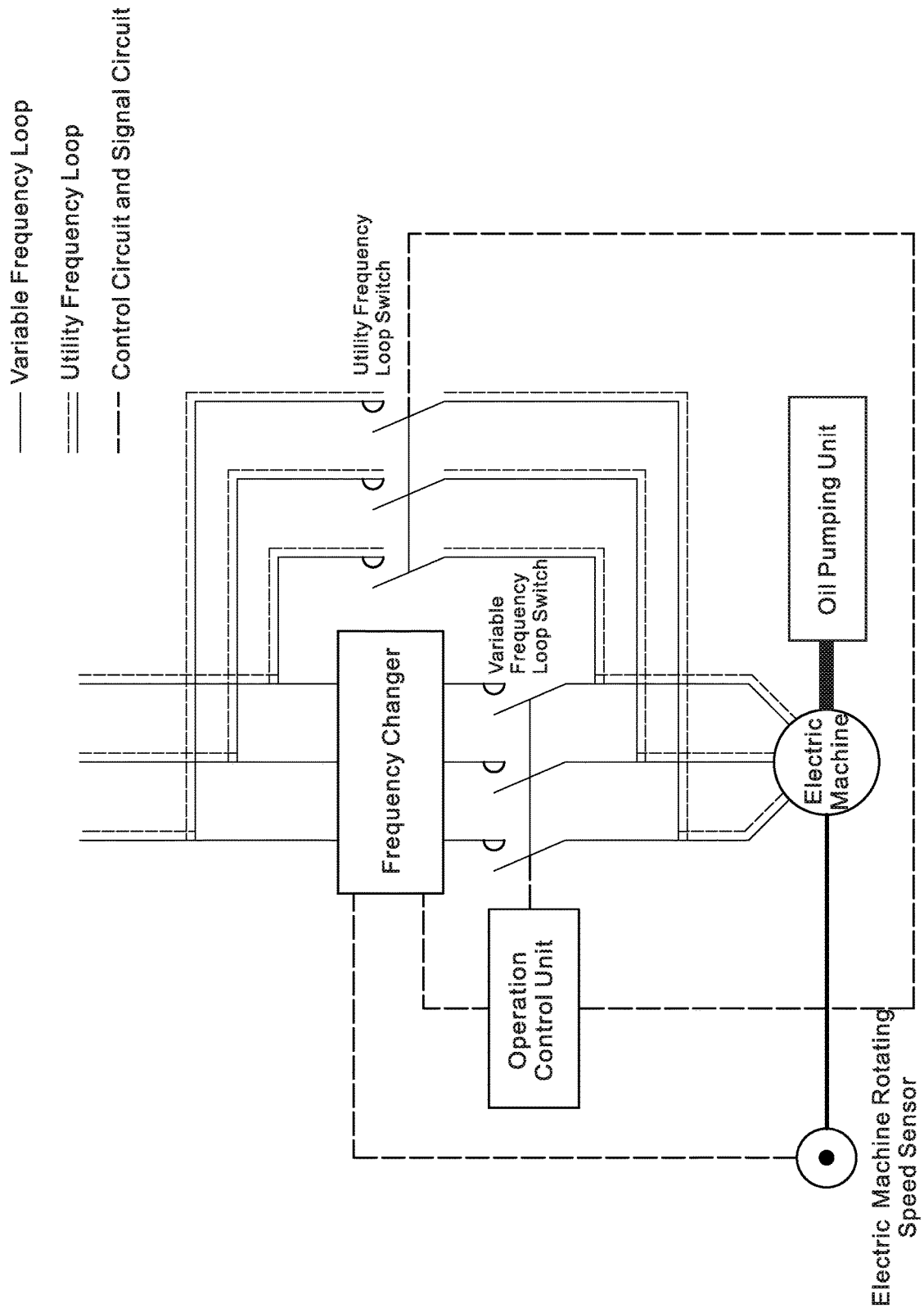
FIG. 3 is a third structural schematic diagram showing the electric machine driving system under the non-conventional work mode of the oil pumping unit of the present invention.

The electric machine driving system under the non-conventional work mode of the oil pumping unit of the present embodiment is shown in FIG. 3. The electric machine driving system is configured with a utility frequency loop and a variable frequency loop. The utility frequency loop and the variable frequency loop are provided with a common input terminal and a common output terminal. The common input terminal of the utility frequency loop and the variable frequency loop is connected to a utility frequency power supply circuit, and the common output terminal of the utility frequency loop and the variable frequency loop is connected to a driving electric machine of the oil pumping unit. A frequency changer is configured in the variable frequency loop. An operation control unit is further provided outside the utility frequency loop and the variable frequency loop. An electric machine rotating speed sensor is further installed on the electric machine.

The utility frequency loop is configured to enable the electric machine to drive the crank complete-cycle operation.

The variable frequency loop is configured to enable the electric machine to drive the crank incomplete-cycle pumping operation and the crank incomplete-cycle no-pumping operation.

The electric machine rotating speed sensor is configured to monitor the rotating speed of the electric machine and send the monitored data to the operation control unit via the frequency changer. The operation control unit is configured to receive a rotating speed signal of the electric machine, and implement a driving control on the electric machine by the frequency changer according to the rotating speed of the electric machine, or change the on-off state of the utility frequency loop and the variable frequency loop.

What needs to be explained is as follows.

For Embodiment 3, Embodiment 4, and Embodiment 5, the explanation is as follows.

1. The three technical solutions, i.e. Embodiment 3, Embodiment 4, and Embodiment 5, do not conflict with each other. When the electric machine driving system under the non-conventional work mode of the oil pumping unit is designed, one of the three technical solutions may be selected, or two or three of the three technical solutions may be selected at the same time. When two technical solutions are selected, for one technical solution, another technical solution is regarded as an alternative solution. When three technical solutions are selected, for one technical solution, the other two technical solutions are regarded as the alternative solutions. As a result, the reliability of the system is increased.

2. For Embodiment 3, when the frequency changer is an open-loop sensor-less vector frequency converter, although physically there is no material object of electric machine rotating speed sensor, the frequency changer has an electromagnetic operation function, which can obtain a result of the electric machine rotating speed through analysis and calculations, and send the result of the electric machine rotating speed to the operation control unit. Also, the rotation parameters of the, electric machine and the crank, can be analyzed and calculated, thereby saving the cost of the electric machine rotating speed sensor, and reducing the equipment cost and the equipment complexity.

3. For Embodiment 4 and Embodiment 5, the electric machine rotating speed sensor not only has the function of electric machine encoder in conventional sense, i.e., provide the rotating speed signal used to realize the closed-loop vector driving to the closed-loop vector frequency changer, but also can obtain the angular displacement of the rotor of the electric machine by integrating the rotating speed over time, and thus the angular displacement of the crank is derived. In this case, when the frequency changer is a closed-loop vector frequency changer, the electric machine rotating speed sensor can be used for two purposes, i.e. the electric machine rotating speed sensor not only can be used to meet driving demands of the frequency changer itself, but also can be used to analyze and calculate the rotary motion of the electric machine and the crank at the macro level. In this case, the operation control unit only needs to obtain the rotating speed signal indirectly from the data communication port of the frequency changer (there must be a data communication between the frequency changer and the operation control unit). As a result, the hardware configuration for obtaining the signal from the electric machine rotating speed sensor is saved.

When the frequency changer used is a common open-loop frequency changer, there is no need for the frequency changer to pass the electric machine rotating speed signal to the operation control unit and the frequency changer is unable to indirectly pass the electric machine rotating speed signal to the operation control unit. In this case, an electric machine rotating speed sensor specially used to analyze and calculate the rotary motion of the electric machine and the crank at the macro level is required. The electric machine rotating speed signal is directly sent from the electric machine rotating speed sensor to the operation control unit.

Embodiment 6

The present embodiment is an embodiment of an electric machine driving system under the non-conventional work mode of the oil pumping unit.

Figure 4:
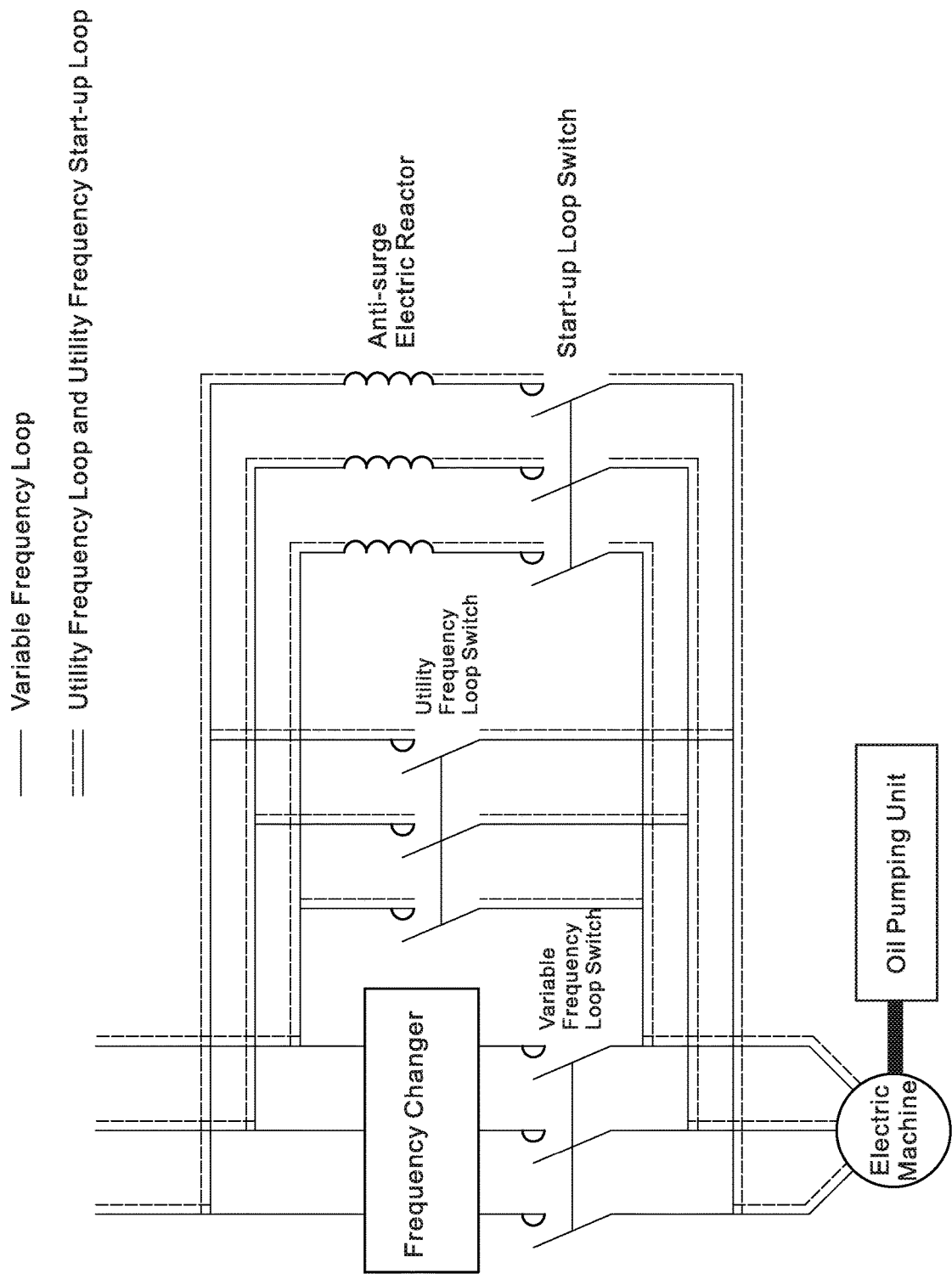
FIG. 4 is a structural schematic diagram showing the first circuit of the start-up loop.

Based on the above-mentioned embodiment, the electric machine driving system under, the non-conventional work mode of the oil pumping unit of the present embodiment further includes a utility frequency start-up loop connected in parallel with the utility frequency loop. The utility frequency start-up loop is serially connected to an anti-surge electric reactor, as shown in FIG. 4.

The process of switching from the variable frequency driving mode to the utility frequency driving mode includes: turning off the variable frequency loop, turning on the utility frequency start-up loop, turning on the utility frequency loop, and turning off the utility frequency start-up loop.

The process of switching from the utility frequency driving mode to the variable frequency driving mode includes: turning off the utility frequency loop and turning on the variable frequency loop.

Embodiment 7

The present embodiment is an embodiment of an electric machine driving system under the non-conventional work mode of the oil pumping unit.

Figure 5:
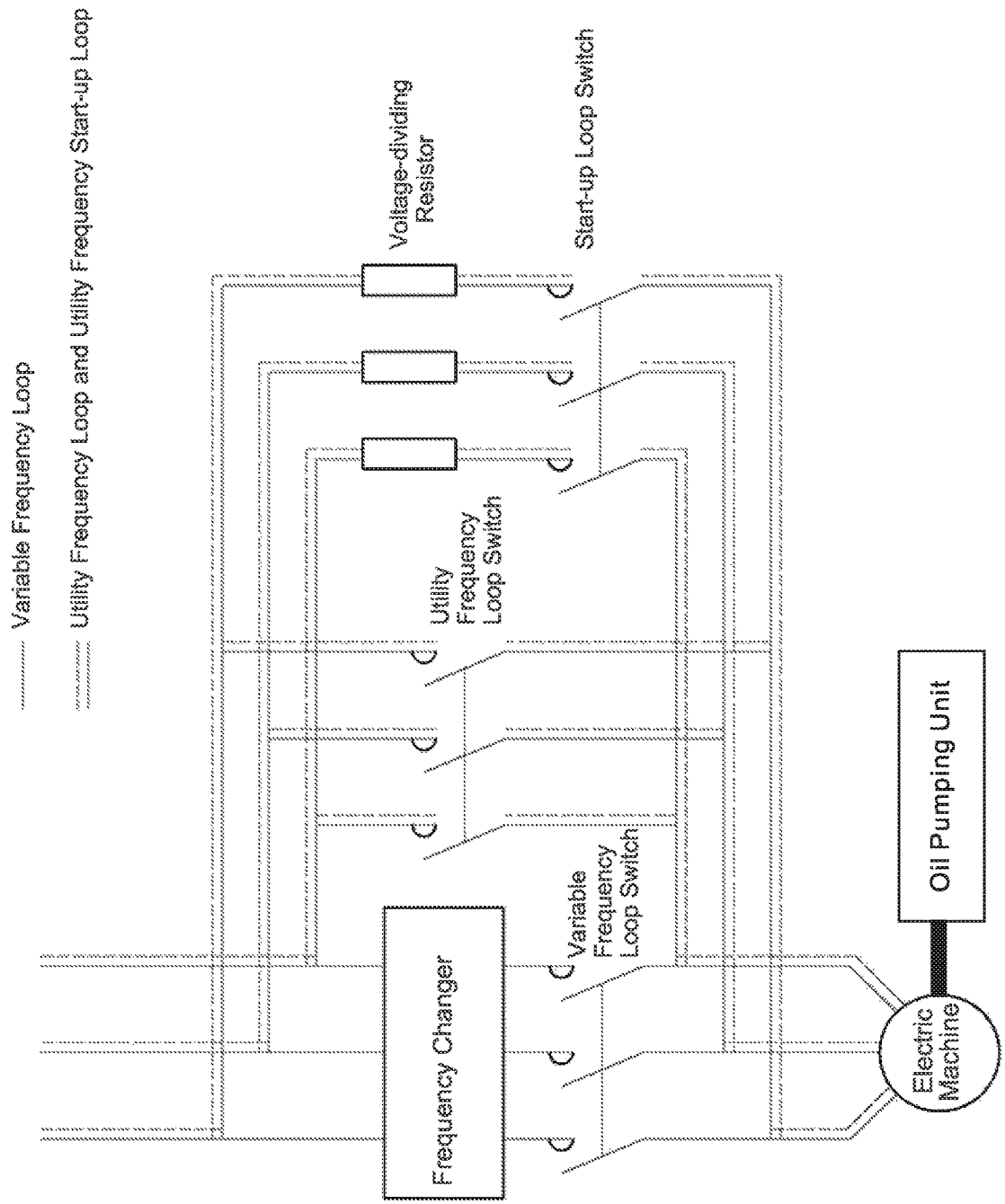
FIG. 5 is a structural schematic diagram showing the second circuit of the start-up loop.

Based on the above-mentioned embodiments of the system, the electric machine driving system under the non-conventional work mode of the oil pumping unit of the present embodiment further includes a utility frequency start-up loop connected in parallel with the utility frequency loop. The utility frequency start-up loop is serially connected to a voltage-dividing resistor, as shown in FIG. 5.

The process of switching from the variable frequency driving mode to the utility frequency driving mode includes: turning off the variable frequency loop, turning on the utility frequency start-up loop, turning on the utility frequency loop, and turning off the utility frequency start-up loop.

The process of switching from the utility frequency driving mode to the variable frequency driving mode includes: turning off the utility frequency loop and turning on the variable frequency loop.

Embodiment 8

The present embodiment is an embodiment of an elects machine driving system under the non-conventional work mode of the oil pumping unit.

Based on the above-mentioned embodiments of the system, the electric machine driving system under the non-conventional work mode of the oil pumping unit of the present embodiment further includes a utility frequency start-up loop connected in parallel with the utility frequency loop. The utility frequency start-up loop is serially connected to an automatic voltage regulator. The automatic voltage regulator includes the following characteristics. At the moment of energization, the voltage drops at the incoming and outgoing terminals are close to the actual voltage of the loop (the input voltage of the corresponding electric machine is quite low). After the energization, the voltages at the incoming and outgoing terminals are continuously, smoothly, and gradually increased (the input voltage of the corresponding electric machine is continuously, smoothly, and gradually increased). The effect of this characteristic is that since the voltage of the common input terminal of the electric machine is quite low when the utility frequency start-up loop is turned on, and the followed smooth and continuous voltage increase of the electric machine input terminal would not cause current impulses to the electric machine, and the input voltage change of the electric machine is small when the utility frequency loop is turned on in the end, so it also would not cause noticeable impulse current. Therefore, this characteristic can perfectly solve the current impulse problem caused during the switching of the walking beam oil pumping unit from the utility frequency to the utility frequency at the same speed.

Figure 6:
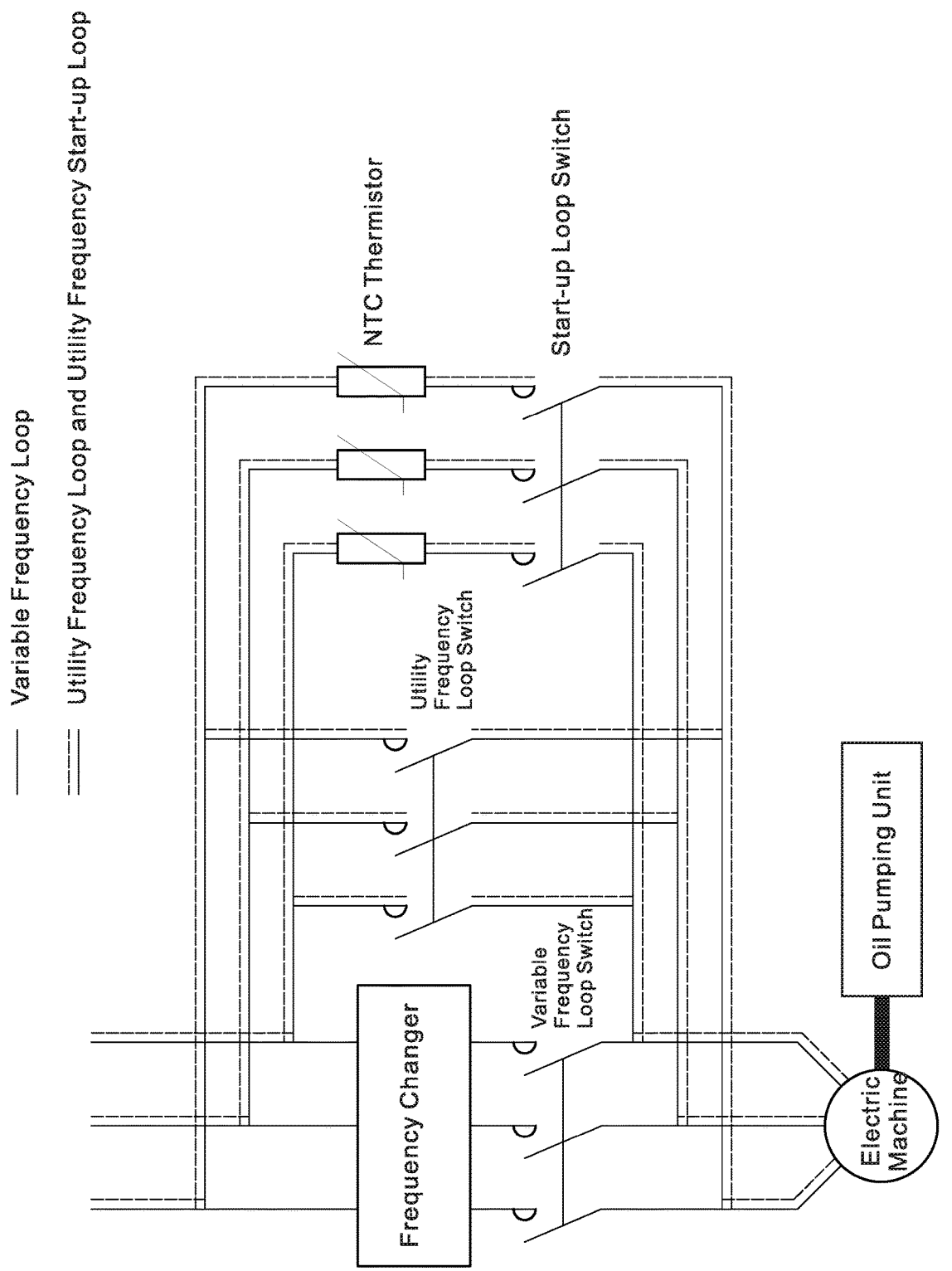
FIG. 6 is a structural schematic diagram showing the third circuit of the start-up loop.

The automatic voltage regulator of the present embodiment is a negative temperature coefficient (NTC) thermistor, as shown in FIG. 6.

The resistance of NTC thermistor decreases as the temperature increases. The resistance of the NTC thermistor, determined by the ambient temperature, is relatively high when the circuit is not energized. The resistance of the NTC thermistor has a relatively strong voltage-dividing effect at the moment of energization. The resistance of the NTC thermistor will gradually decrease as the NTC thermistor itself gets heated after the energization until the thermal equilibrium temperature is reached. In this case, the resistance of the NTC thermistor is negligible as it is quite low. By means of the voltage-dividing function of the NTC thermistor, the objective of steplessly changing the voltage of the input common terminal of the electric machine from low level to high level in the transition process of switching from the variable frequency loop to the utility frequency loop can be realized, and the ultimate objective of switching with low current impulse at the same speed can be realized.

The process of switching from the variable frequency driving mode to the utility frequency driving mode includes: turning off the variable frequency loop, turning on the utility frequency start-up loop, turning on the utility frequency loop, and turning off the utility frequency start-up loop.

The process of switching from the utility frequency driving mode to the variable frequency driving mode includes: turning off the utility frequency loop and turning on the variable frequency loop.

Embodiment 9

The present embodiment is an embodiment of an electric machine driving system under the non-conventional work mode of the oil pumping unit.

Based on the above-mentioned embodiments of the system, the electric machine driving system under the non-conventional work mode of the oil pumping unit of the present embodiment further includes a utility frequency start-up loop connected in parallel with the utility frequency loop. The utility frequency start-up loop is serially connected to an automatic voltage regulator. The automatic voltage regulator includes the following characteristics. At the moment of energization, the voltage drops at the incoming and outgoing terminals are close to the actual voltage of the loop (the input voltage of the corresponding electric machine is quite low). After the energization, the voltages at the incoming and outgoing terminals are continuously, smoothly, and gradually increased (the input voltage of the corresponding electric machine is continuously, smoothly, and gradually increased). The effect of this characteristic is that since the voltage of the common input terminal of the electric machine is quite low when the utility frequency start-up loop is turned on, and the followed smooth and continuous voltage increase of the electric machine input terminal would not cause current impulses to the electric machine, and the input voltage change of the electric machine is small when the utility frequency loop is turned on in the end, so it also would not cause noticeable impulse current. Therefore, this characteristic can perfectly solve the current impulse problem caused during the switching of the walking beam oil pumping unit from the utility frequency to the utility frequency at the same speed.

Figure 7:
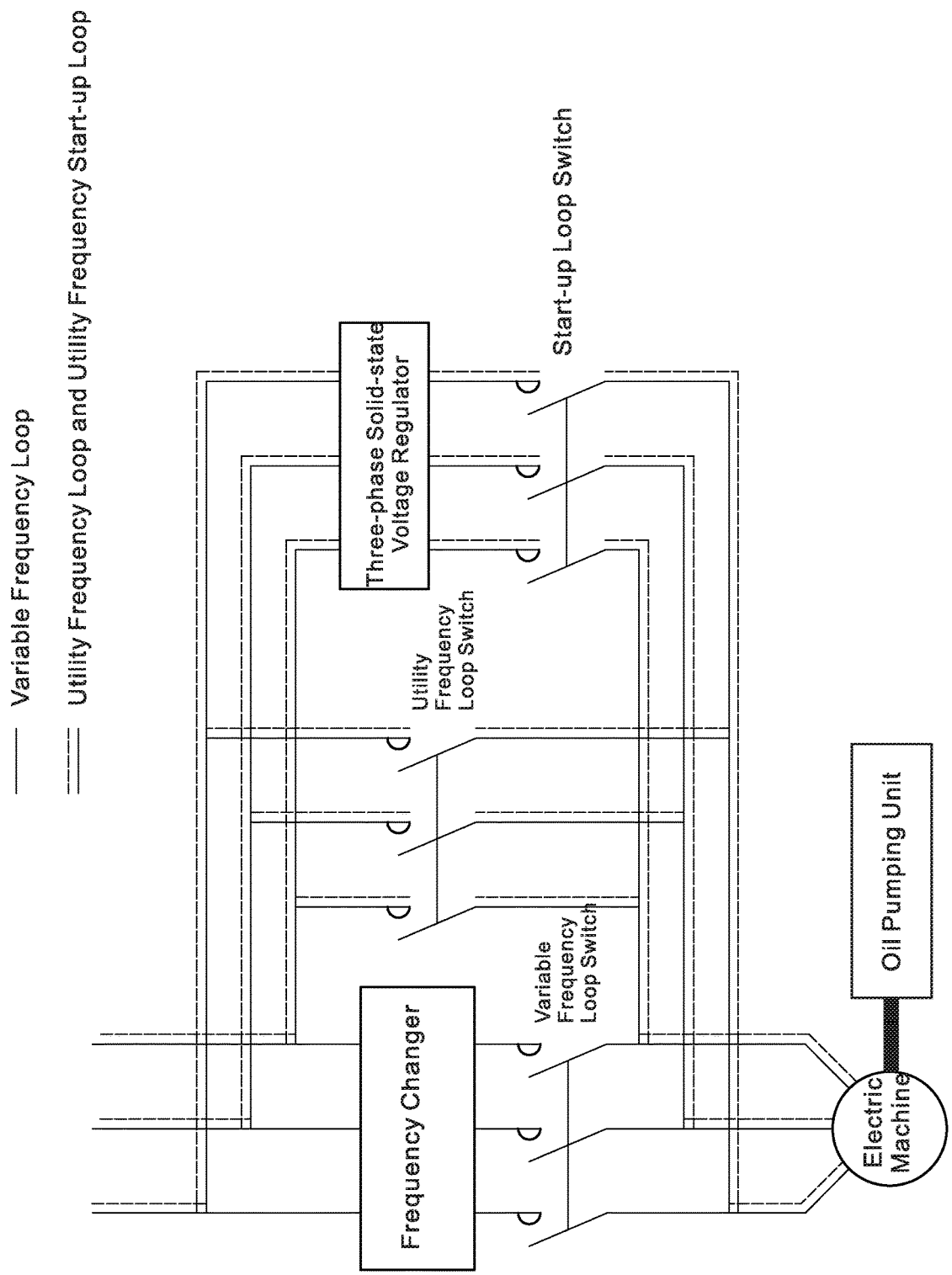
FIG. 7 is a structural schematic diagram showing the fourth circuit of the start-up loop.

The automatic voltage regulator of the present embodiment is a three-phase solid-state voltage regulator, as shown in FIG. 7.

The output voltage of the three-phase solid-state voltage regulator is controlled by the conduction phase angle of the thyristor, so the low output voltage at the moment of energization, and the gradual and stepless increase of the output voltage to a level close to the input voltage can be realized. By means of the voltage-controlling function of the three-phase solid-state voltage regulator, a gradual increase of the external voltage executed to the common input terminal of the electric machine in the transition process of switching from the variable frequency loop to the utility frequency loop can be realized, and the ultimate objective of switching with low current impulse at the same speed can be realized.

The process of switching from the variable frequency driving mode to the utility frequency driving mode includes: turning off the variable frequency loop, turning on the utility frequency start-up loop, turning on the utility frequency loop, and turning off the utility frequency start-up loop.

The process of switching from the utility frequency driving mode to the variable frequency driving mode includes: turning off the utility frequency loop and turning on the variable frequency loop.

The designs of the start-up loop according to Embodiment 6, Embodiment 7, Embodiment 8 and Embodiment 9 facilitate to reduce the current impulse when the variable frequency driving mode is switched to the utility frequency driving mode.

Embodiment 10

The present embodiment is an embodiment of an electric machine driving system under the non-conventional work mode of the oil pumping unit.

Based on the above-mentioned embodiments of the system, the electric machine driving system under the non-conventional work mode of the oil pumping unit of the present embodiment is further limited in that the rated power of the frequency changer is smaller than the rated power of the electric machine.

Such design has two following functions.

First, since the cost of the low-power frequency changer is lower than that of the high-power frequency changer, the rated power of the frequency changer is limited as less than the rated power of the electric machine, which is helpful in reducing the investment for equipment cost.

Second, since the output power of the frequency changer is lower, the associated harmonic wave is lower, the rated power of the frequency changer limited as less than the rated power of the electric machine can effectively reduce the harmonic wave pollution to the power grid.

What is claimed is:

1. An electric machine driving method under a non-conventional work mode of an oil pumping unit, comprising:

switching a crank complete-cycle operation to a crank incomplete-cycle pumping operation, and then to a crank incomplete-cycle no-pumping operation without shutting down the oil pumping unit; or switching the crank incomplete-cycle no-pumping operation to the crank incomplete-cycle pumping operation, and then to the crank complete-cycle operation without shutting down the oil pumping unit, wherein, the crank complete-cycle operation uses a utility frequency driving mode, the crank incomplete-cycle pumping operation and the crank incomplete-cycle no-pumping operation use a variable frequency driving mode;

driving the oil pumping unit, by the variable frequency driving mode, to perform the crank incomplete-cycle pumping operation and the crank incomplete-cycle no-pumping operation; adjusting and controlling mechanical energy accumulated by the oil pumping unit by means of adjusting a swing amplitude of a crank during the crank incomplete-cycle pumping operation and the crank incomplete-cycle no-pumping operation, wherein a peak rotating speed of the electric machine in a bidirectional motion is constantly adjusted; and switching from the variable frequency driving mode to the utility frequency driving mode when the peak rotating speed of the electric machine in a direction of the bidirectional motion under the utility frequency driving mode falls within a range containing a rated rotating speed under the utility frequency driving mode of the electric machine; and turning off the utility frequency driving mode to make the oil pumping unit enter a free-running operation state; and switching to the variable frequency driving mode, when the peak rotating speed of the electric machine falling within a range containing a predetermined rotating speed of the electric machine.

* * * * *